(12) United States Patent
Arimilli et al.

(10) Patent No.: US 6,532,519 B2
(45) Date of Patent: Mar. 11, 2003

(54) APPARATUS FOR ASSOCIATING CACHE MEMORIES WITH PROCESSORS WITHIN A MULTIPROCESSOR DATA PROCESSING SYSTEM

(75) Inventors: Ravi Kumar Arimilli, Austin, TX (US); James Stephen Fields, Jr., Austin, TX (US); Sanjeev Ghai, Round Rock, TX (US); Jody Bern Joyner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 09/740,218

(22) Filed: Dec. 19, 2000

(65) Prior Publication Data

US 2002/0078309 A1 Jun. 20, 2002

(51) Int. Cl.$^7$ .............................. G06F 12/08
(52) U.S. Cl. ...................... 711/119; 711/145
(58) Field of Search ................ 711/119, 120, 711/121, 130, 138, 145, 146

(56) References Cited

U.S. PATENT DOCUMENTS 5,710,881 A * 1/1998 Gupta et al. ............... 345/541
6,038,642 A * 3/2000 Arimilli et al. ............ 711/121

* cited by examiner

*Primary Examiner*—Reginald G. Bragdon
*Assistant Examiner*—Midys Inoa
(74) *Attorney, Agent, or Firm*—Casimer K. Salys; Bracewell & Patterson, L.L.P.

(57) ABSTRACT

An apparatus for associating cache memories with processors within a multiprocessor data processing system is disclosed. The multiprocessor data processing system includes multiple processing units and multiple cache memories. Each of the cache memories includes a cache memory controller, and each cache memory controller includes a mode register. Each mode register has multiple processing unit fields, and each of the processing unit fields is associated with one of the processing units for indicating whether or not data from an associated processing unit should be cached by a cache memory associated to a corresponding cache memory controller.

5 Claims, 2 Drawing Sheets

APPARATUS FOR ASSOCIATING CACHE MEMORIES WITH PROCESSORS WITHIN A MULTIPROCESSOR DATA PROCESSING SYSTEM

BACKGROUND OF THE INVENTION

1. Technical Field

The present invention relates to cache memories in general and, in particular, to an apparatus for controlling data allocation among cache memories within a multiprocessor data processing system. Still more particularly, the present invention relates to an apparatus for associating cache memories with processors within a symmetric multiprocessor data processing system.

2. Description of the Prior Art

In a symmetric multiprocessor (SMP) data-processing system, all of the processing units are generally identical; that is, they all have the same architecture and utilize a common set or subset of instructions and protocols to operate. Typically, each processing unit includes a processor core having at least one execution unit for carrying out program instructions. In addition, each processing unit may include at least one level of caches, commonly referred to as primary or L1 caches, which are typically implemented with high-speed memories. Similarly, a second level of caches, commonly referred to as secondary or L2 caches, may also be included in each processing unit for supporting the primary caches. Sometime, a third level of caches, commonly referred to as tertiary or L3 caches, may also be included in each processing unit for supporting the secondary caches. Each level of caches stores a subset of data and instructions contained in a system memory for low-latency accesses by various processor cores.

The present disclosure describes an apparatus for associating caches with various processing units within a symmetric multiprocessor data processing system.

SUMMARY OF THE INVENTION

In accordance with a preferred embodiment of the present invention, a multiprocessor data processing system includes multiple processing units and multiple cache memories. Each of the cache memories includes a cache memory controller, and each cache memory controller includes a mode register. Each mode register has multiple processing unit fields, and each of the processing unit fields is associated with one of the processing units for indicating whether or not data from an associated processing unit should be cached by a cache memory associated to a corresponding cache memory controller.

All objects, features, and advantages of the present invention will become apparent in the following detailed written description.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF A PREFERRED EMBODIMENT

Although the present invention is illustrated with a symmetric multiprocessor (SMP) data processing system, the present invention can also be implemented in a variety of multiprocessor data processing system configurations.

Figure 1:
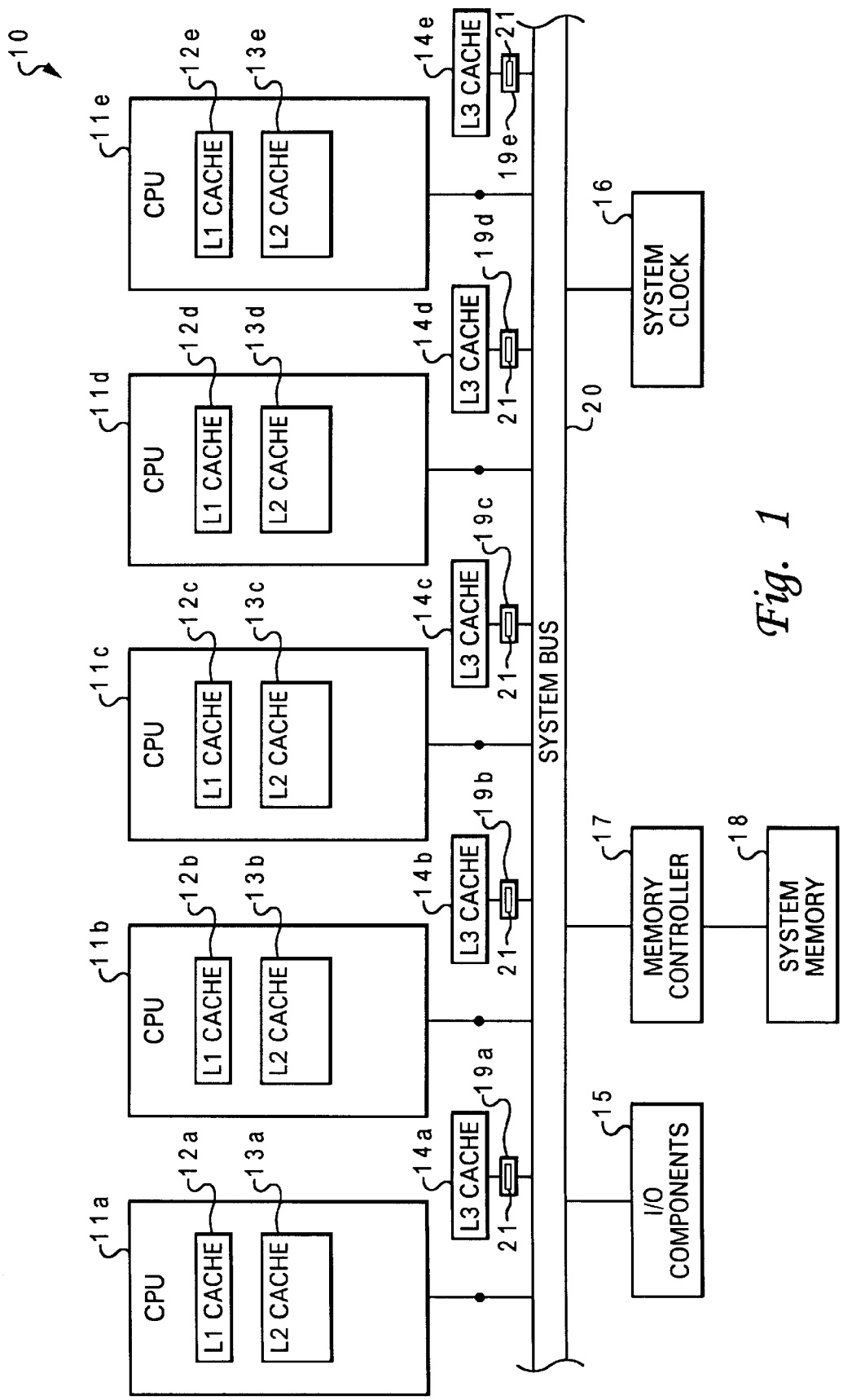
FIG. 1 is a block diagram of a symmetric multiprocessor data processing system in which a preferred embodiment of the present invention is implemented.

Referring now to the drawings and, in particular, to FIG. 1, there is depicted a block diagram of a SMP data processing system in which a preferred embodiment of the present invention may be implemented. As shown, an SMP data processing system 10 includes multiple central processor units (CPUs) 11a–11e, and each of CPUs 11a–11e contains as least one level of local cache. For example, CPU 11a contains a primary cache 12a and a secondary cache 13a, CPU 11b contains a primary cache 12b and a secondary cache 13b, etc.

All CPUs 11a–11e are coupled to an interconnect such as a system bus 20. For enhanced scalability, the interconnect may also be implemented by utilizing a cross-bar switch. In addition to primary caches 12a–12e and secondary caches 13a–13e, a third level of caches are included within SMP data processing system 10 for supporting CPUs 11a–11e. As shown, tertiary caches 14a–14e are connected to system bus 20. Each of tertiary caches 14a–14e is associated with a corresponding level three (L3) cache controller. For example, tertiary cache 14a associates with an L3 cache controller 19a, tertiary cache 14b associates with an L3 cache controller 19b, etc.

A system clock 16 is coupled to system bus 20 for supplying clock signals to all the components, such as I/O components 15, within SMP data processing system 10. Coupled between a system memory 18 and system bus 20, memory controller 17 contains various instructions and data for the normal operations of SMP data processing system 10.

For the purpose of illustration, a CPU, a primary cache, and a secondary cache (such as CPU 11a, primary cache 12a, and secondary cache 13a, as depicted in FIG. 1) may be collectively known as a processing unit.

In accordance with a preferred embodiment of the present invention, each L3 cache controller within SMP data processing system 10, such as L3 cache controller 19a, is capable of caching data on behalf of any one processing unit, or various combinations of multiple processing units within SMP data processing system 10. Each L3 cache controller contains a mode register to indicate which processing unit(s) the L3 cache controller should handle. A mode register has multiple fields, with each field corresponding to each processing unit for which the L3 cache could potentially cache data.

Figure 2:
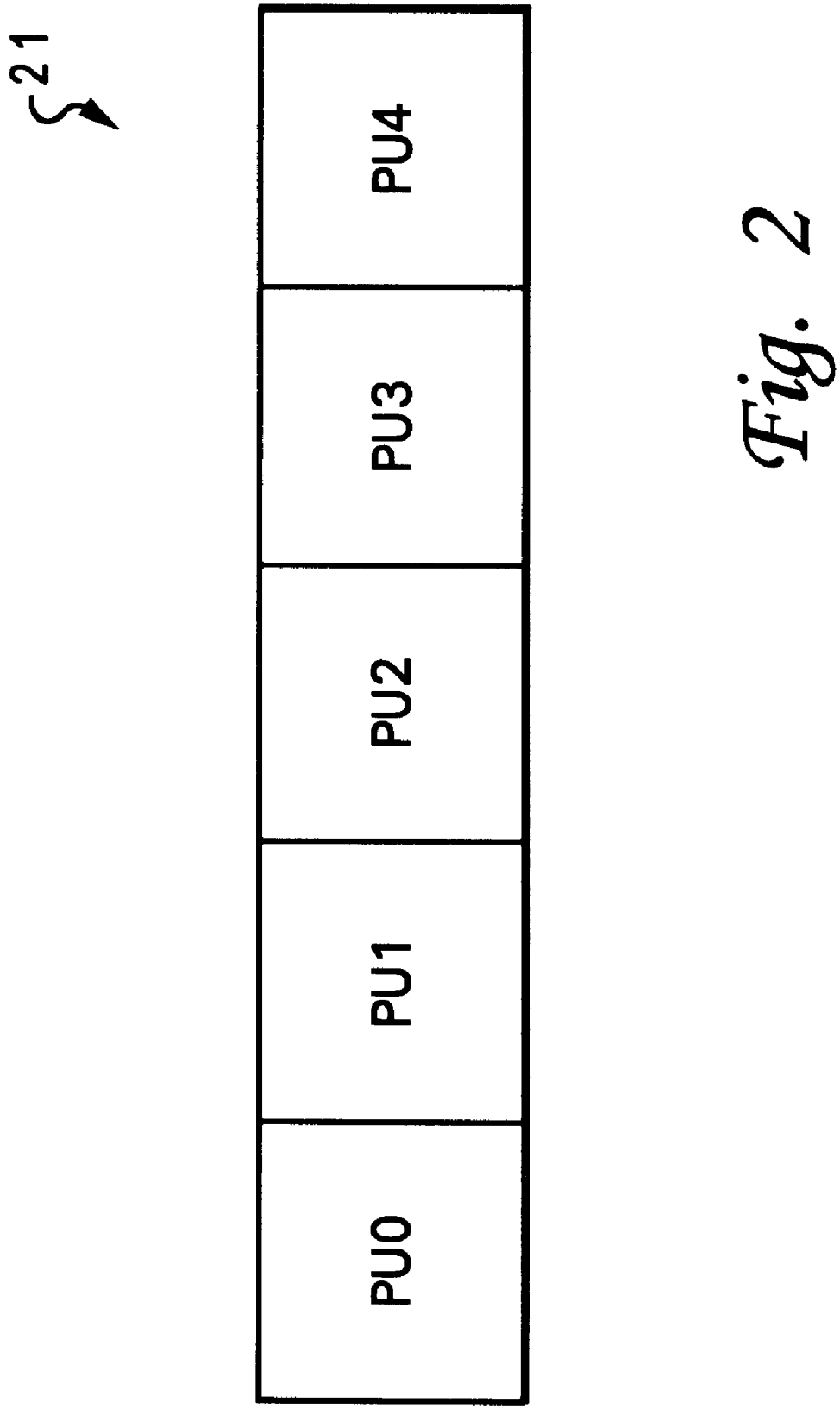
FIG. 2 is a block diagram of a mode register within a cache controller for a cache memory in the symmetric multiprocessor data processing system from FIG. 1, in accordance with a preferred embodiment of the present invention.

With reference now to FIG. 2, there is illustrated a block diagram of a mode register in accordance with a preferred embodiment of the present invention. As shown, a mode register 21 includes five processing unit fields, namely, PU 0 through PU 4, each processing unit field being one bit long. In this example, mode register 21 is to be utilized in SMP data processing system 10 from FIG. 1 having five processing units. Thus, each of the five processing unit fields in mode register 21 is related to a respective processing unit within SMP data processing system 10. For example, PU0 is related to processing unit 11a, PU1 is related to processing unit 11b, PU3 is related to processing unit 11c, etc.

A logical "1" in a processing unit field within mode register 21 means an associated L3 cache should cache on behalf of the corresponding processing unit. A logical "0" in the processing unit field means the associated L3 cache should not cache on behalf of the corresponding processing unit. Mode register 21 may be associated with none (i.e., when all five processing unit fields have a logical "0"), one or several of the processing units within an SMP data processing system. Thus, for SMP data processing system 10, a mode register of a given L3 cache controller may be associated with none, one or several of the processing units within SMP data processing system 10, up to a total of five processing units.

During operation, if a request from a processing unit is detected on system bus 20 (from FIG. 1) by an L3 cache controller, and the processing unit field within the L3 cache controller's mode register corresponding to the requesting processing unit has a logical "1" then the L3 cache controller will service the request as if the L3 cache controller were dedicated to caching on behalf of that processing unit. For example, if a request from a processing unit 11b is detected on system bus 20 by L3 cache controller 19a and the processing unit field within L3 cache controller 19a's mode register corresponding to processing unit 11b (i.e., PU1) has a logical "1," then L3 cache controller 19a will service the request from processing unit 11b.

Otherwise, if a request from a processing unit is detected on system bus 20 by an L3 cache controller, and the processing unit field within the L3 cache controller's mode register corresponding to the requesting processing unit has a logical "0," the request will be ignored by the L3 cache controller. For example, if a request from a processing unit 11c is detected on system bus 20 by L3 cache controller 19b and the processing unit field within L3 cache controller 19b's mode register corresponding to processing unit 11c (i.e., PU2) has a logical "0" then L3 cache controller 19b will ignore the request.

The rules for setting up the processing unit fields of mode register 21 are as follows. Each L3 cache controller can be associated with multiple processing units for which the L3 cache controller may or may not be cached, but each processing unit can be associated with only one L3 cache controller. Thus, L3 cache controller 19c, for example, can cache for any one or more of the five processing units, but a processing unit, such as processing unit 11c, can be associated with only one of the five L3 cache controller. It is not required that all L3 caches be capable of caching on behalf of all processing units. Thus, it is possible for one of the five L3 cache controllers to have a logical "1" in all the processing unit fields of its mode register, while the remaining four L3 cache controllers have a logical "0" in all the processing unit fields of their respective mode registers.

From a system initialization standpoint, it is probably best for each processing unit to have its corresponding processing unit field set to a logical "1" in a mode register of one and only one L3 cache controller. However, with the present invention, each processing unit can be associated with more than one L3 cache memories by modifying each cache controller's mode register via hardware or software programming techniques that are well-known in the art. The association of processing units to cache controllers may be set statically or changed dynamically during system operations.

Under the present invention, it is also possible for two or more L3 caches to be merged together, using an interleaving or other address space partitioning policy, such that the merged L3 caches act as a single larger cache. With such merging, each L3 cache controller that participates in such a merged cache group has its mode register set to the same value such that all L3 cache controllers in the merged cache group act on behalf of the same subset of processing units. In such a case, the system initialization rule stated above is generalized such that each processing unit should end up with its corresponding processing unit field set to a logical "1" in the mode register of the L3 cache controller of one and only one cache group. Note that a cache group could be a single L3 cache controller or any number of merged L3 cache controllers, and there could be a mixture of cache group sizes in a given multiprocessor data processing system.

As has been described, the present invention provides an apparatus for associating cache memories with processors within an SMP data processing system. Advantages of the present invention include (1) the ability to align a cache subsystem to physical boundaries in the hardware to optimize affinity between a system memory and cache memories, or between cache memories and interconnect bandwidth, (2) the ability to align the cache subsystem to logical partition boundaries, and (3) the ability to decouple the number of processing units that can be installed in a multiprocessor data processing system from the number of cache memories that must be installed/enabled in the multiprocessor data processing system such that if a given cache memory is not physically present or is deconfigured due to a hardware fault, one or more other cache memories can handle a request without having to deconfigure all the processing units.

While the invention has been particularly shown and described with reference to a preferred embodiment, it will be understood by those skilled in the art that various changes in form and detail may be made therein without departing from the spirit and scope of the invention.

What is claimed is:

1. A data processing system comprising:

a plurality of processing units;

a plurality of cache memories, wherein one of said plurality of cache memories is associated with a cache memory controller; and a mode register in communication with said cache memory controller, wherein said mode register includes a plurality of processing unit fields each associated with a respective one of said plurality of processing units to indicate whether or not data from said plurality of processing units should be cached by said cache memory associated with said cache memory controller.

2. The data processing system of claim 1, wherein said cache controller can associate with more than one of said processing units.

3. The data processing system of claim 1, wherein one of said processing units can associate with only one cache controller.

4. The data processing system of claim 1, wherein said mode register is programmable.

5. A method for associating cache memories with processors within a data processing system, wherein said data processing system includes a plurality of processing units, said method comprising:

coupling a cache memory with a cache memory controller; and coupling a mode register with said cache memory controller, wherein said mode register includes a plurality of processing unit fields, wherein each of said processing unit fields is associated with one of said processing units to indicate whether or not data from said associated processing unit should be cached by a cache memory associated to said cache memory controller.

* * * * *